(12) United States Patent
Osborne et al.

(10) Patent No.: US 10,140,564 B2
(45) Date of Patent: Nov. 27, 2018

(54) MODULATION OF DISPLAY IMAGERY FOR BARCODE SIMULATION

(71) Applicant: Samsung Electronics Co., Ltd., Suwon-si, Gyeonggi-do (KR)

(72) Inventors: John Osborne, Palo Alto, CA (US); David Russell, Winter Garden, FL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/528,826

(22) PCT Filed: Nov. 23, 2015

(86) PCT No.: PCT/US2015/062218
§ 371 (c)(1),
(2) Date: May 23, 2017

(87) PCT Pub. No.: WO2016/085886
PCT Pub. Date: Jun. 2, 2016

(65) Prior Publication Data
US 2017/0344867 A1 Nov. 30, 2017

Related U.S. Application Data

(60) Provisional application No. 62/084,302, filed on Nov. 25, 2014.

(51) Int. Cl.
*G06K 7/10* (2006.01)
*G06K 19/06* (2006.01)
*G06K 7/14* (2006.01)

(52) U.S. Cl.
CPC .... *G06K 19/06112* (2013.01); *G06K 7/10722* (2013.01); *G06K 7/1417* (2013.01)

(58) Field of Classification Search
CPC ............... G06K 19/06112; G06K 7/14; G06Q 20/3274; G06Q 20/32
(Continued)

(56) References Cited

U.S. PATENT DOCUMENTS 5,760,383 A  6/1998  Heske, III
8,556,176 B2  10/2013  Van Horn et al.
(Continued)

FOREIGN PATENT DOCUMENTS

EP  2 239 686 B1  5/2012
EP  2 722 791 A1  4/2014
(Continued)

OTHER PUBLICATIONS

International Preliminary Report on Patentability of PCT/US2015/062218 dated Jun. 8, 2017.

*Primary Examiner* — Jamara Franklin
(74) *Attorney, Agent, or Firm* — Jefferson IP Law, LLP (57) ABSTRACT

A method of modulating display imagery for barcode simulation is provided. Barcode information is received into a portable device. The portable device includes an image capture system, the image capture system including an image sensor that is configured to convert light into discrete signals. The image capture system has an image sensor controller that is configured to control the image sensor. The image capture system has an image processor that is configured to convert the discrete signals into formatted image data. The portable device has a display system having a display screen configured to display formatted image data. The barcode information is used to manipulate the image capture system such that the display screen displays a light simulated barcode.

19 Claims, 4 Drawing Sheets

(58) Field of Classification Search
USPC .............. 235/375, 379, 454, 462.01, 462.45, 235/462.46, 472.01
See application file for complete search history.

(56) References Cited

U.S. PATENT DOCUMENTS

| | | |
|---|---|---|
| 8,733,650 B1 | 5/2014 | Segal et al. |
| 8,807,432 B2 | 8/2014 | Van Horn et al. |
| 8,939,363 B2 | 1/2015 | Powell et al. |
| 9,245,219 B2 | 1/2016 | Van Horn et al. |
| 9,286,559 B2 | 3/2016 | Powell et al. |
| 9,333,401 B2 | 5/2016 | Rice et al. |
| 9,682,288 B2 | 6/2017 | Rice et al. |
| 2012/0000983 A1 | 1/2012 | Bhagwan et al. |
| 2012/0187184 A1 | 7/2012 | Challa et al. |
| 2013/0075464 A1 | 3/2013 | Van Horn et al. |
| 2013/0190103 A1 | 7/2013 | Rice et al. |
| 2013/0271508 A1 | 10/2013 | Kaneko et al. |
| 2014/0034723 A1 | 2/2014 | Van Horn et al. |
| 2014/0156376 A1* | 6/2014 | Sellers ................... G06Q 20/20 705/14.38 |
| 2014/0263632 A1 | 9/2014 | Powell et al. |
| 2014/0312125 A1 | 10/2014 | Noumura et al. |
| 2014/0353373 A1 | 12/2014 | Van Horn et al. |
| 2015/0011325 A1 | 1/2015 | Rice et al. |
| 2015/0129656 A1 | 5/2015 | Powell et al. |
| 2016/0250523 A1 | 9/2016 | Rice et al. |

FOREIGN PATENT DOCUMENTS

| | | |
|---|---|---|
| JP | H11-313215 A | 11/1999 |
| JP | 2000-032276 A | 1/2000 |
| JP | 2002-117372 A | 4/2002 |
| JP | 2005-033282 A | 2/2005 |
| JP | 2005-086356 A | 3/2005 |
| JP | 2008-269550 A | 11/2008 |
| JP | 2010-008451 A | 1/2010 |
| JP | 2013-236363 A | 11/2013 |
| JP | 2014-211709 A | 11/2014 |
| RU | 90 599 U1 | 2/2009 |
| RU | 97 199 U1 | 3/2010 |

* cited by examiner

*FIG. 6*

MODULATION OF DISPLAY IMAGERY FOR BARCODE SIMULATION

BACKGROUND OF THE INVENTION

The present invention relates generally to communicating encoded information from a personal electronic device to a barcode scanner.

A barcode is a machine-readable representation of data. Barcodes are typically printed on items, such as paper labels or packaging for goods, manufacturer's or retailer's coupons, or on tickets or passes such as airline boarding passes. Barcode scanners (also referred to as barcode readers) are used to extract information from barcodes by detecting light reflected by the barcode from a moving light beam. Barcode scanners are found in many different types of facilities including stores and supermarkets, airport security check-in and boarding areas, stadiums, libraries, test centers, conference centers, and in many other contexts. The use of barcode scanners has dramatically increased the speed and convenience of performing many commonplace transactions.

While typically printed on paper or other objects, barcodes may also be displayed on the electronic display screens of personal electronic devices such that the barcode can be read by a barcode scanner. While it can be useful to present coupons and other information in barcode form on the display screen of a personal electronic device, there are disadvantages. Some barcode scanners, for example, cannot reliably read barcodes displayed on certain types of displays because the contrast ratio between the bars and spaces shown on the display screen, which typically is a liquid crystal display (LCD), is not sufficient. Further, the physical dimensions and/or resolution of the display screen may also limit the size of the barcode that may be displayed at one time.

A technology that simulates barcodes using pulsed light and thereby overcomes various limitations of static screen-displayed barcodes is disclosed in, for example, U.S. Pat. No. 6,685,093 issued Feb. 3, 2004 to Challa et al. This technique, however, may have certain limitations. For example, some personal electronic devices may not be capable of performing the technique, or are controlled by application program interfaces that for technical or business reasons cannot be modified to accomplish the technique.

Therefore, what is needed is an improved technique for communicating barcode information.

SUMMARY OF THE INVENTION

The present invention provides a method of modulating display imagery for barcode simulation. In accordance with an embodiment, barcode information is received into a portable device. The portable device includes an image capture system, the image capture system including an image sensor that is configured to convert light into discrete signals. The image capture system has an image sensor controller that is configured to control the image sensor. The image capture system has an image processor that is configured to convert the discrete signals into formatted image data. The portable device has a display system having a display screen configured to display formatted image data. The barcode information is used to manipulate the image capture system such that the display screen displays a light simulated barcode.

This and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

The display screen of a portable electronic device may be used for many purposes. One such use is for communicating information to a barcode scanner with variations in light that simulate a reflection of a scanning beam being moved across a static visual image of a barcode, which may be referred to as a "light-simulated barcode." The light-simulated barcode technology as well as the various types of digital devices suitable for using light-simulated barcodes are described in, for example, U.S. Pat. No. 6,685,093 issued Feb. 3, 2004 to Challa et al., U.S. Pat. No. 6,736,322 issued May 18, 2004 to Gobburu et al., U.S. Pat. No. 6,877,665 issued Apr. 12, 2005 to Challa et al., U.S. Pat. No. 7,028,906 issued Apr. 18, 2006 to Challa et al., U.S. Pat. No. 7,395,961 issued Jul. 8, 2008 to Challa et al., U.S. Pat. No. 7,857,225 issued Dec. 28, 2010 to Challa et al., and U.S. Pat. No. 7,967,211 issued Jun. 28, 2011 to Challa et al., all of which hereby are incorporated by reference herein in their entireties.

Various types of light sources, including those in use in pixel-based display devices, may be used for light-simulated barcodes. LCDs that utilize a backlight for screen brightness may, for example, be effective in producing light-simulated barcodes because the entire backlight may be modulated to provide the desired light/dark sequence. Even displays which have no backlight, including but not limited to, light-emitting diode (LED), organic light-emitting diode (OLED), electroluminescent, and plasma displays, may be used for producing light-simulated barcodes.

Suitable digital devices vary greatly in their processing power and memory. Some may lack the processing power, memory, or both needed to carry out light-simulated barcode processing without adversely affecting device performance, and some may not be able to carry out light-simulated barcode processing at all. While increasing the processing power and memory of the digital device itself is an option, it may not be a practical or cost-effective option in some cases.

Digital cameras and other portable devices, such as smart phones, are typically equipped with an image capture system including an image sensor, such as a charge coupled device (CCD) sensor, as well as a display screen. Such sensors can typically produce a real-time camera image on the display. Such a real-time image is one that can change, for example, when the device is moved or the sensor is pointed at a moving object. Still images or video clips can be stored in memory and later reproduced on the display. It has been shown that modulation of the display brightness, e.g. by modulating a display backlight, can be used to stimulate the light sensor of a one-dimensional barcode reader. The present invention is directed toward manipulating the image capture system, for example, the brightness of image data output from the image sensor, so that the image being displayed can be used to transmit barcode information from the device to a barcode reader. An embodiment of the present invention is therefore directed toward modulation of one or more light characteristics of real-time imagery and specifically to modulation of sensor image signals to simulate reading of a barcode.

Figure 1:
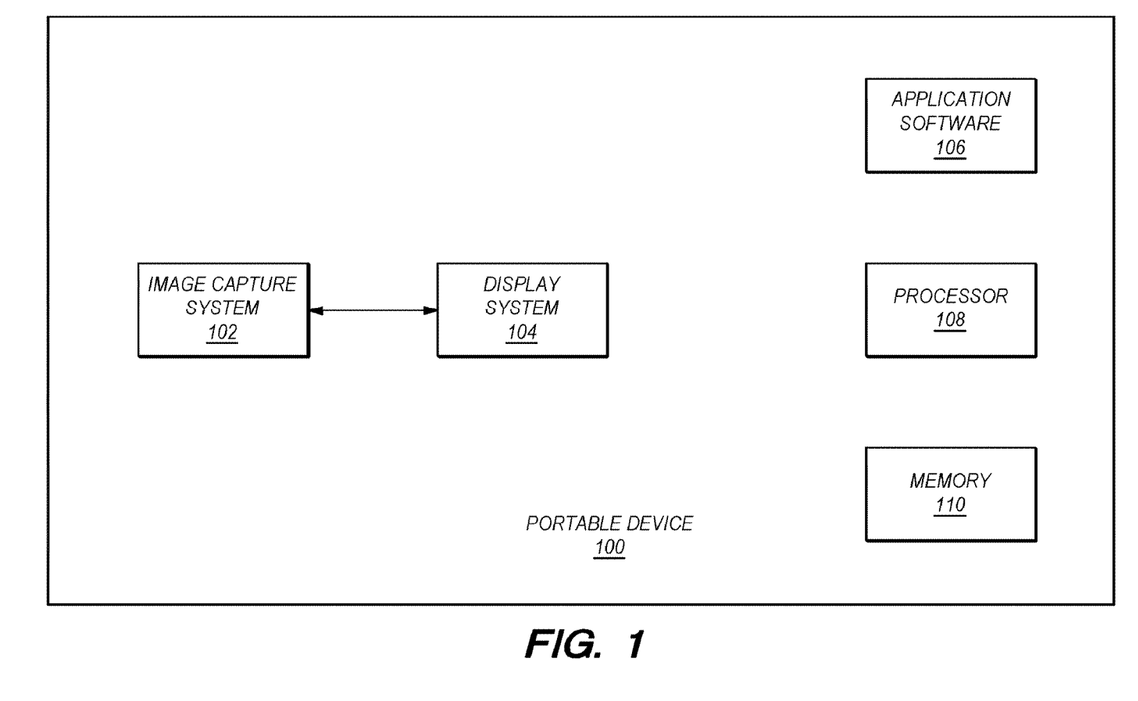
FIG. 1 illustrates a schematic block diagram of a portable electronic device configured to modulate display imagery in accordance with an embodiment of the present invention.

FIG. 1 illustrates a schematic block diagram of a portable electronic device 100 in which display imagery can be modulated in accordance with an embodiment of the present invention. The portable electronic device 100 can preferably be easily carried by the user and has an imaging capability, and can be any of various devices, including but not limited to, a mobile phone, smartphone, personal digital assistant (PDA), gaming device, audio and video player, fob, universal serial bus (USB) flash drive, tablet computer, laptop computer, ultrabook computer, notebook computer, convertible computer, and a variety of multimedia convergence products such as the IPHONE™ mobile digital device available from Apple Inc. of Cupertino, Calif., USA, and various competitive devices that run the Android operating system.

Such portable electronic devices can include a processor and a computer-readable medium in any suitable combination of hardware, firmware and software. Examples of processors include microprocessors, controllers and logic circuits, and a processor may be implemented as a multi-core unit or by multiple processor units. Examples of computer readable media, which may be realized in a single type of read-only memory or readable-writable memory or which may include combinations of different types of memory, include static random access memory (SRAM), dynamic random access memory (DRAM), FLASH memory, solid-state memory, magnetic memory, optical memory, compact disk read-only memory, and so forth. Data and programs containing processor-executable instructions for operating the mobile personal digital device and implementing various applications may be stored in the computer-readable medium and executed by the processor. Such portable devices can also include special-purpose and dedicated hardware that can include digital, analog or both types of circuitry.

As shown in FIG. 1, an exemplary portable device 100 includes an image capture system 102 and a display system 104. The image capture system 102 generally includes at least an image sensor that is configured to convert light into discrete signals. The image sensor can be, for example, a CCD image sensor. The image capture system 102 can also include circuitry that controls operation of the image sensor and that converts discrete signals generated by the image sensor into a format suitable for display as still images or video, such as JPEG or MPEG.

The display system 104 generally includes a display such as an LED or LCD display screen. The display system 104 can also include associated display circuitry that controls operation of the display system 104, such as its backlight, and that receives formatted still images or video signals, such as JPEG or MPEG to be displayed by the display screen.

As shown in FIG. 1, the portable device 100 can include application software 106, a processor 108 and memory 110. The software 106, processor 108 and memory 110 can control operation of the device 100 so as to perform a variety of functions, including providing a user interface for displaying menus and the like to a user, accepting input from the user, as well as other functions. For example, a user may employ the user interface to selectively store a barcode within the portable device 100. In this case, the barcode can be obtained by the portable device 100 by the user capturing an image of a barcode using the image capture system 102, by the user downloading the barcode from a remote location (e.g. from a website via the Internet), by receiving the barcode in a message (e.g. a text message or an email message) or in some other manner. The selected barcode can be stored as a numerical code in memory 110.

Image and video files can also be stored in the memory 110. These can include image and video files generated by the image capture system 102 as well as image and video files obtained in another manner such as by the user downloading them or receiving them in a text or email message. Software applications 106 can also be stored in the memory 110.

An image captured by the image capture system 102 can be displayed in real-time on the display screen of the display system 104. Alternatively, an image or video file stored memory 110 can be retrieved from the memory 110 and displayed on the display screen of the display system 104. In accordance with an embodiment of the invention, the image capture system 102 is manipulated so that the image or video displayed on the display screen simulates a barcode through modulation of light intensity and/or color. For example, the user can employ the user interface to select a barcode to be transmitted. The barcode can be present in the memory 110. In this case, a software application 106 can control the processor 108 to retrieve the stored barcode from the memory 110. The application 106 and processor 108 may then control the image capture system 102 to modulate one or more parameters of the image, such as its brightness, contrast, intensity, or color such that the display of the device 100 transmits the selected barcode in light simulated form so that a barcode reader may then detect the barcode.

More particularly, the simulated signal can be transmitted as light pulses. For purposes of the present description, the term "light" is a broad term as used herein, and includes visible light and infrared light spectra. The term "pulse" refers merely to detectible changes in characteristics of the light. The light pulses may be generated in any visible or infrared wavelength. The light signals may be varied in any desired way, including by varying brightness or by turning the light output on and off, by varying color, or in other ways.

Figure 2:
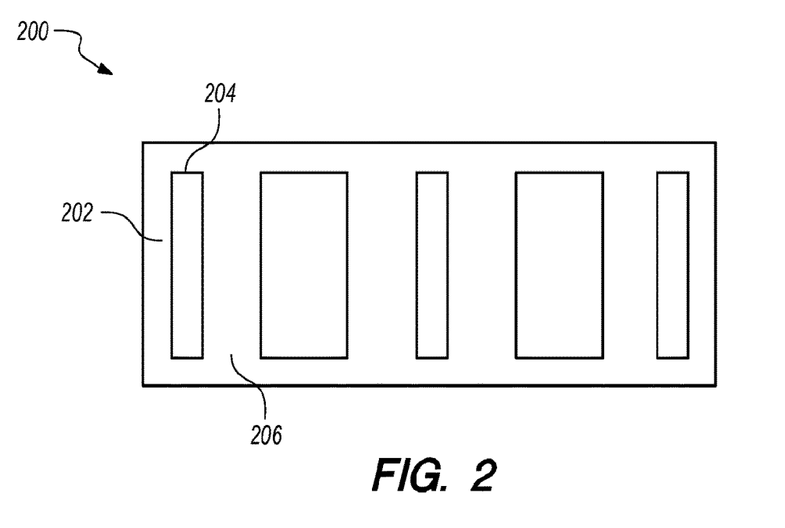
FIG. 2 illustrates a one-dimensional barcode that can be communicated in accordance with an embodiment of the present invention.

FIG. 2 shows an illustrative one-dimensional barcode 200. As shown in FIG. 1A, the barcode 200 includes a quiet zone 202, bars 204, and spaces 206. The quiet zone 202 and spaces 206 need to be distinguishable from the bars 204. For example, the bars 204 can be lighter or darker than the quiet zone 202 and spaces 206 so that more or less light is reflected when scanned by a barcode scanner.

Figure 3:
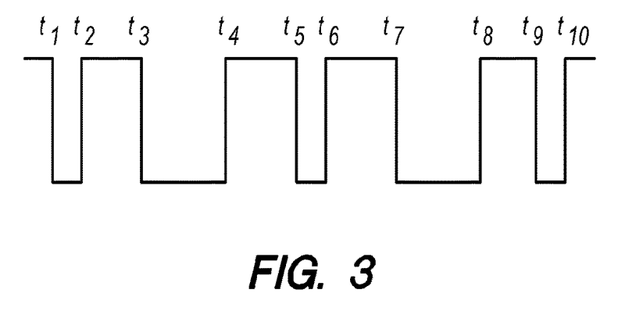
FIG. 3 illustrates a graph of a modulated characteristic of a signal for communicating a one-dimensional barcode in accordance with an embodiment of the present invention.

FIG. 3 shows an idealized representation of a signal that may be generated for transmission as light pulses, by which is created light that simulates the reflection of a scanning beam off the barcode 200 depicted in FIG. 2. Referring to FIGS. 2 and 3, as a scanning beam scans across the quiet zone 202 and the spaces 206, the beam is reflected to the scanner. As the beam scans across the bars 204, however, the beam is at least partly absorbed such that the reflected beam has a lower amplitude than the beam reflected from the lighter quiet zone 202 and spaces 206. Thus, the amplitude of the signal received at the scanner decreases at times t1, t3, t5, t7, and t9, which correspond to the beam reaching a leading edge of a bar 204, and increases at time t2, t4, t6, t8, and t10, which correspond to the beam reaching the falling edge of a bar 204.

Data encoded in a barcode format may be actively provided to a sequential barcode scanner by providing a light-based representation of a signal, such as shown in FIG. 3, to a scanner, instead of providing a potentially less reliable static barcode image to the scanner. Since many barcode scanner receivers will receive visual or infrared wavelength signals, mobile digital devices that have display components that operate at these wavelengths can be used to provide an active light representation of the simulated reflected scanning beam to a sequential barcode scanner. The barcode data may thus be actively provided to current or improved sequential barcode scanners without the requirement of altering the existing barcode scanner infrastructure.

When the barcode scanner receives the signal, the scanner decodes the on/off sequence of the beam to determine the barcode data being provided.

Figure 4:
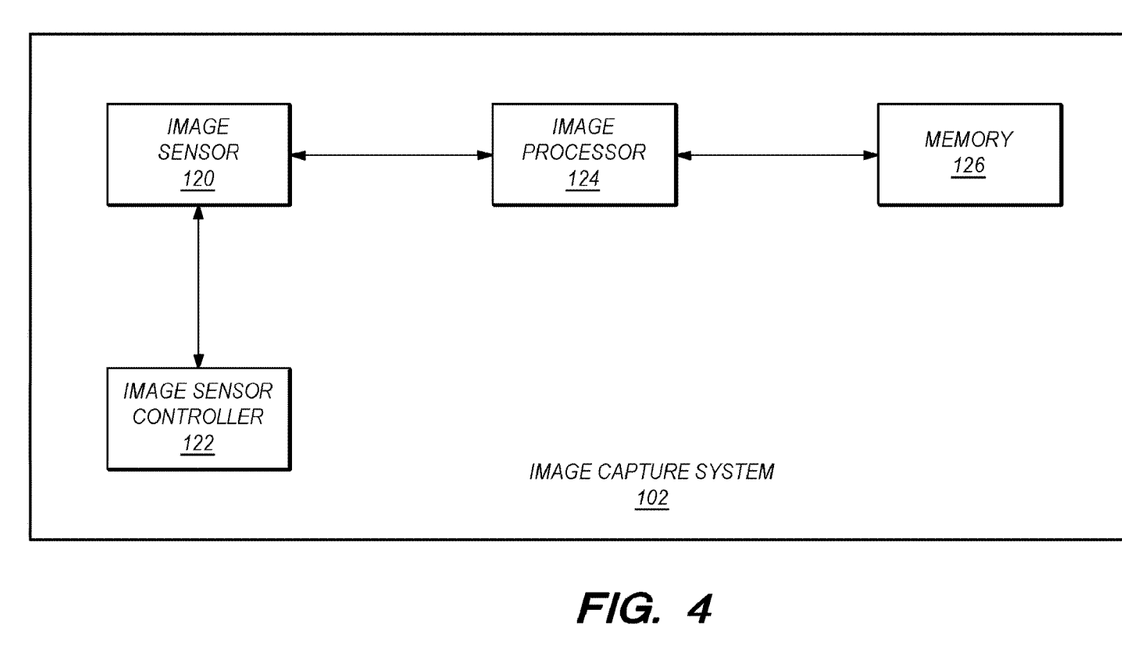
FIG. 4 illustrates a schematic block diagram of an image capture system of a portable electronic device in accordance with an embodiment of the present invention.

FIG. 4 illustrates a schematic block diagram of an image capture system 102 of a portable electronic device 100. FIG. 4 provides additional detail of an image capture system 102 that may be employed in accordance with in accordance with embodiments of the present invention. As shown in FIG. 4, the image capture system 102 includes an image sensor 120, which can be a CCD sensor, an image sensor controller 122, an image processor 124 and memory 126. The image sensor controller 122 can provide analog power supply and control signals to the image sensor 120 and can change these signals in order to modulate characteristics of the image captured by the sensor 122 so as to generate a light simulated barcode. For example, the image sensor controller 122 can control voltage supply signals to the image sensor 122 that effect brightness or intensity of the captured image or portions thereof.

The image processor 124 receives from the image sensor 120 signals representative of the captured image and processes these signals into a format suitable for display or storage. For example, the image processor 124 can receive analog signals that are representative of brightness or intensity for sensor elements corresponding to image pixels. These signals can be amplified, filtered, digitized, compressed and formatted as images or video. For example, images may be formatted as digital JPEG image files or MPEG video, including MPEG-1, MPEG-2 and MPEG-4. Other digital image and video formats are possible, such as Quicktime, 3GPP, TIFF, RIF, bitmap (BMP) and so forth. Other possible formats include analog video formats, such as red-green-blue (RBG) video, luminance-chrominance (Y-C) video, S-video, as so forth.

The formatted images or video can then be stored in memory 126 for later retrieval and display by the display system 104 (FIG. 1). The memory 126 can be part of the memory 110 shown in FIG. 1 or the memory 126 can be a separate memory device. In addition to, in instead of, storing the formatted images or video, the formatted images or video can be provided directly to the display system 104 for immediate ("real-time") display.

The image sensor controller 122 can manipulate the captured images or video, by modulating characteristics of them, so as to generate a light simulated barcode upon display by the display system 104. For example, the controller 122 can modulate supply voltages provided to the sensor array so as to modulate brightness or intensity of the signals provided to the image processor 124 in accordance with the particular barcode to be simulated. When processed by the image processor 124 and displayed, this results in the displayed image having its brightness or intensity modulated which simulates the barcode for a barcode reader that receives the modulated image.

In addition to, or instead of, the sensor controller 122 manipulating the image signals in order to generate a light-simulated barcode, the image processor 124 can manipulate the image signals. For example, the image processor can modulate a level of amplification applied to the signals prior to digitization, or can multiply digital samples by a modulated multiplication factor prior to formatting the image signals. Alternatively, or in addition, the signal processor 122 can modulate colors of the images, a color filter applied to the image data, contrast of the images or other image characteristics. When displayed, this image manipulation results in the displayed image having its displayed characteristics, such as brightness, intensity, and/or color, modulated which simulates the barcode for a barcode reader that receives the modulated image.

The modulation applied to the image signals by the image sensor controller 122 and the image processor 124 can be controlled by an application program 106 and the device processor 108 so as to simulate a particular selected barcode.

As described herein, the control processor 108 is not directly controlling information displayed by the display system 104 in order to generate a light simulated barcode, but instead controls parameters within the image capture system 102 such as brightness, contrast, color, etc. to generate a light simulated barcode. For example, through dedicated hardware within the image capture system 102, hardware device(s) attached to the image capture system 102, through software within the device 100 manipulating the brightness levels of the image sensor, or through software within the image capture system 102 itself, the sensor can be directed to modulate its brightness level or other characteristics such that barcode information can be transferred from the portable device 100 to a barcode scanning device.

Figure 5:
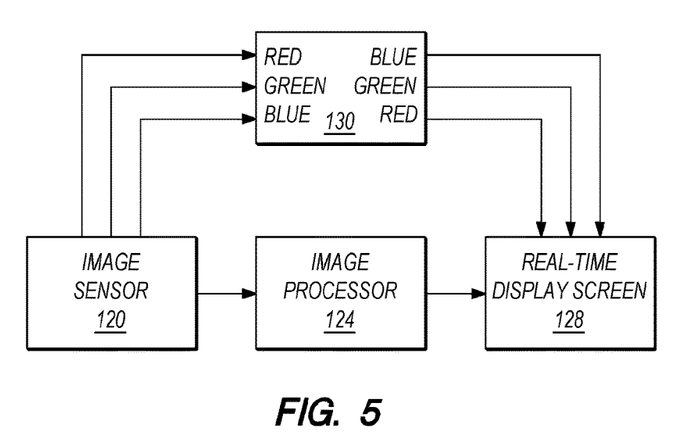
FIG. 5 illustrates a schematic block diagram of a portable electronic device configured to modulate display imagery in accordance with an embodiment of the present invention.

As described in connection with FIG. 4, the image processor 124 is located in the signal path between the image sensor 120 and the display system 104. In this case, the image processor 124 is preferably able to directly manipulate, store, and analyze the image in real-time as the manipulated image is displayed. However, the modulation need not be performed in real-time if the image processor 124 lacks the computation bandwidth. Thus, alternatively, the image data can be stored into memory 110 or 126 and processed on a frame-by-frame basis by the image processor 124, and then streamed to the display screen to achieve modulation needed for barcode simulation. Alternatively, or additionally, the resultant modulated image data can be returned to memory 110 or 126, and displayed at a later time FIG. 5 illustrates a schematic block diagram of a portable electronic device in which display imagery can be modulated in accordance with an embodiment of the present invention. The device shown in FIG. 5 can be the same as the devices shown in FIGS. 1 and 3 with differences noted herein. As shown in FIG. 5, an additional path between the image sensor 120 and a display screen 128 is provided through modulation device 130. This path is in addition to, or in place of, the signal path through the image processor 124. The modulation device 130 can be implemented by hardware such as a complex programmable logic device (CPLD), custom IC, or other dedicated processing resources connected to the image sensor 120 and configured to modulate image characteristics such as brightness or color levels. As shown in FIG. 5, the modulation device 130 can be designed or retrofit into the data path between the image sensor 120 and the display screen 128. The device 130 may then directly manipulate the data stream in real-time, for example, to transpose colors so that modulation is achieved by alternating between displaying colors a barcode scanner is sensitive to and colors the barcode scanner is not sensitive to. The device 130 could also switch back and forth between the real-time image and a solid color (e.g. black, white, red, green, etc.) or between different solid colors. This switching is modulated according to a particular barcode so as to transfer the barcode data to the scanner. Then, once the barcode simulation is complete, the display can be returned to the real-time image or some other image or turned off. While Red, Green, and Blue (RGB) data streams can be used to represent image data, other formats, including but not limited to, YUV, Component, Composite, color mapped, S-VIDEO, or HDMI data streams of varying pixel height, width, and color depth could be manipulated in similar manner.

By employing modulation device 130, the modulation can be performed in real-time even if the image processor 124 lacks the computation bandwidth to perform the modulation in real-time. The modulation device 130 can alternatively be configured to modulate characteristics of a stored image or video rather than in real-time.

Often there are connectors between the image sensor system 102 and the image processor 124 or the system processor 108, and/or between the display screen 128 and other elements of the system. These connectors provide access to the image signals for retrofitting the image modulation hardware 130 into an existing device.

Many mobile devices with 2D imaging systems are capable of scanning and interpreting 2D barcodes, including but not limited to, High Capacity Color Barcode (HCCB) from Microsoft™, 3-DI, ArrayTag, Aztec Code, Small Aztec Code, Codablock, Code 1, code 16K, Code 49, ColorCode, Compact Matrix Code, CP Code, CyberCode, d-touch, DataGlyphs, DataMatrix, Datastrip Code, Dot Code A, EZCode, Grid Matrix Code, HueCode, INTACTA Code, JAGTAG, MaxiCode, mCode, MiniCode, MicroPDF417, MMCC, Nintendo e-Reader#Dot code, Optar, PaperDisk, PDF417, PDMark, QR Code, QuickMark Code, SmartCode, Snowflake Code, SPARQCode, SuperCode, Trillcode, UltraCode, UnisCode, Vericode, VSCode, and WaterCode. None of these 2D encoding technologies, however, can be interpreted by a 1D barcode scanner.

Figure 6:
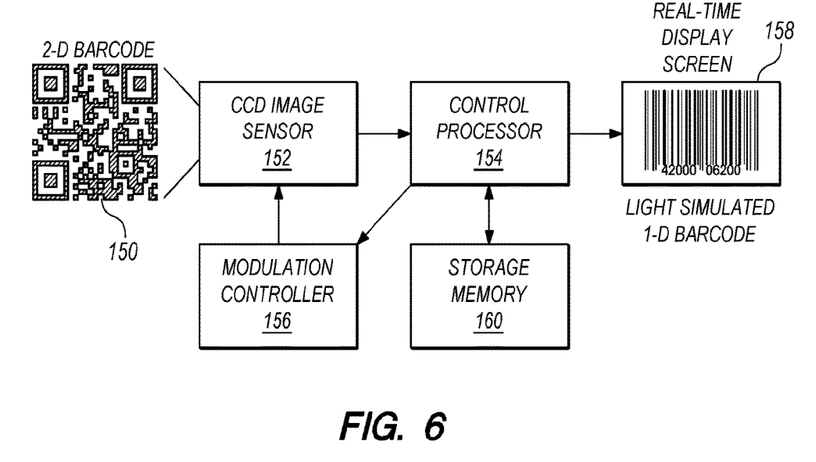
FIG. 6 illustrates a schematic block diagram of a portable electronic device in which a 2D barcode can be converted to a 1D barcode in accordance with an embodiment of the present invention.

FIG. 6 illustrates a schematic block diagram of a portable electronic device in which a 2D barcode can be converted to a 1D light simulated barcode and in accordance with an embodiment of the present invention. In FIG. 6, 2D barcode information scanned by the imaging system is interpreted in a conventional manner, but subsequently converted to 1D format information, and the display screen brightness is then modulated to transfer the 2D information in a format compatible with 1D scanners. The 2D barcode being scanned may also be simultaneously displayed on the device's display screen.

More particularly, as shown in FIG. 6, a 2D barcode 150, or other multidimensional barcode, is captured by an image sensor 152. A processor 154 may then interpret the 2D barcode and convert the 2D barcode to a 1D dimensional code. A modulation controller 156 may then manipulate a real time image (which can be the image of the 2D barcode) in accordance with the 1D barcode so that the 1D barcode is simulated by modulation of lights characteristics emitted by display 158. The 2D barcode or the 1D barcode, or both, can be stored in memory 160. As described herein a modulated image can also be stored in memory 160 such that it can be retrieved and displayed as a light-simulated barcode. A method of converting multidimensional barcodes to one dimensional barcodes is disclosed in U.S. Patent Publication No. 2014/0156376, by Sellers et al., the entire contents of which are hereby incorporated by reference.

As described herein, a simulated barcode is generated through modulation of one or more light characteristics of real-time imagery and specifically to modulation of sensor image signals within an image capture system 102 (FIG. 1). Optionally, one or more characteristics of the display system 104 (FIG. 2) can also be modulated. For example, modulation of a display backlight can also be modulated to simulate the barcode. In this case, the modulation occurring in the display system 104 is preferably synchronized with modulation performed within the image capture system so as to avoid having the modulated signals cancel each other.

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. Unless otherwise explicitly stated, any specific values given herein are illustrative, and may be varied as desired. Where various timings are set forth, these timings may not be exact unless otherwise explicitly stated, but rather may vary depending on circuit layout, signal line impedance, and other practical design factors as are well known in the art. A reference to individual values indicative of a range is inclusive of all values within the range. These and other variations and modifications of the embodiments disclosed herein, including of the alternatives and equivalents of the various elements of the embodiments, may be made without departing from the scope of the invention.

What is claimed is:

1. A method of modulating display imagery for barcode simulation comprising:
  receiving barcode information at an image sensor of a portable device;
  converting, by the portable device, the barcode information into discrete signals;
  processing, by the portable device, the discrete signal into formatted image data;
  displaying, at the portable device, imagery based on the formatted image data; and
  modulating, at the portable device, light characteristics of the imagery while switching a display of a display screen back-and-forth between the imagery and a solid color, to simulate the barcode information as a light simulated barcode.

2. The method according to claim 1, wherein modulating the light characteristics comprises modulating brightness of the imagery.

3. The method according to claim 1, wherein modulating the light characteristics comprises manipulating color of the imagery.

4. The method according to claim 1, wherein modulating the light characteristics comprises manipulating signals supplied to the image sensor.

5. The method according to claim 1, wherein modulating the light characteristics comprises manipulating the discrete signals.

6. The method according to claim 1, further comprising storing formatted image data prior to displaying the imagery on the display screen.

7. The method according to claim 1, further comprising modulating the light characteristics while switching the display of the display screen back-and-forth in real time while an image comprising the barcode information is being captured by the image sensor.

8. The method according to claim 1, further comprising modulating the light characteristics of the imagery via a modulation device interposed between the image sensor and the display screen.

9. The portable device according to claim 8, wherein the modulation device is implemented by one or more of a complex programmable logic device, a custom integrated circuit, or a dedicated processing resource connected to the image sensor.

10. The method according to claim 1, wherein the received barcode information is representative of a multidimensional barcode; and
further comprising converting the multidimensional barcode to a one dimensional barcode prior to modulating the light characteristics.

11. The portable device according to claim 10, further comprising a display controller that receives the formatted image data for display on the display screen; and
wherein the display controller controls parameters of the display screen.

12. A portable device for modulating display imagery to simulate a barcode, the portable device comprising:
an image sensor that converts received light into discrete signals;
an image processor that converts the discrete signals into formatted image data;
a display screen that displays imagery based on the formatted image data; and
a modulation device that, in response to the portable device receiving barcode information, modulates light characteristics of the imagery emitted by the display screen while switching a display of the display screen back-and-forth between the imagery and a solid color, to simulate the barcode information as a light simulated barcode, wherein the image processor is defined in a first signal path between the image sensor and the display screen, and the modulation device is defined in a second signal path between the image sensor and the display screen.

13. The portable device according to claim 12, wherein the modulation device modulates brightness of the imagery displayed by the display screen to modulate the light characteristics.

14. The portable device according to claim 12, wherein the modulation device modulates color of the imagery displayed by the display screen to modulate the light characteristics.

15. The portable device according to claim 12, wherein the modulation device manipulates signals supplied to the image sensor to modulate the light characteristics.

16. The portable device according to claim 12, wherein the modulation device modulates the discrete image signals generated by the image sensor to modulate the light characteristics.

17. The portable device according to claim 12, further comprising a memory coupled to the image processor, wherein the memory stores the formatted image data prior to display of the light simulated barcode.

18. The portable device according to claim 12, wherein the modulation device modulates the light characteristics while switching the display screen back-and-forth to simulate the light simulated barcode in real time while an image comprising the barcode information is being captured by the image sensor.

19. The portable device according to claim 12, wherein:
the received barcode information is representative of a multidimensional barcode; and
the multidimensional barcode is converted to a one dimensional barcode prior to modulating the light characteristics to simulate the barcode information as the light simulated barcode.

\* \* \* \* \*